Oct. 18, 1966 L. J. BOUTWELL 3,279,825
EXTENSIBLE AND SWINGABLE TOW HITCH
Filed March 27, 1964 2 Sheets-Sheet 1
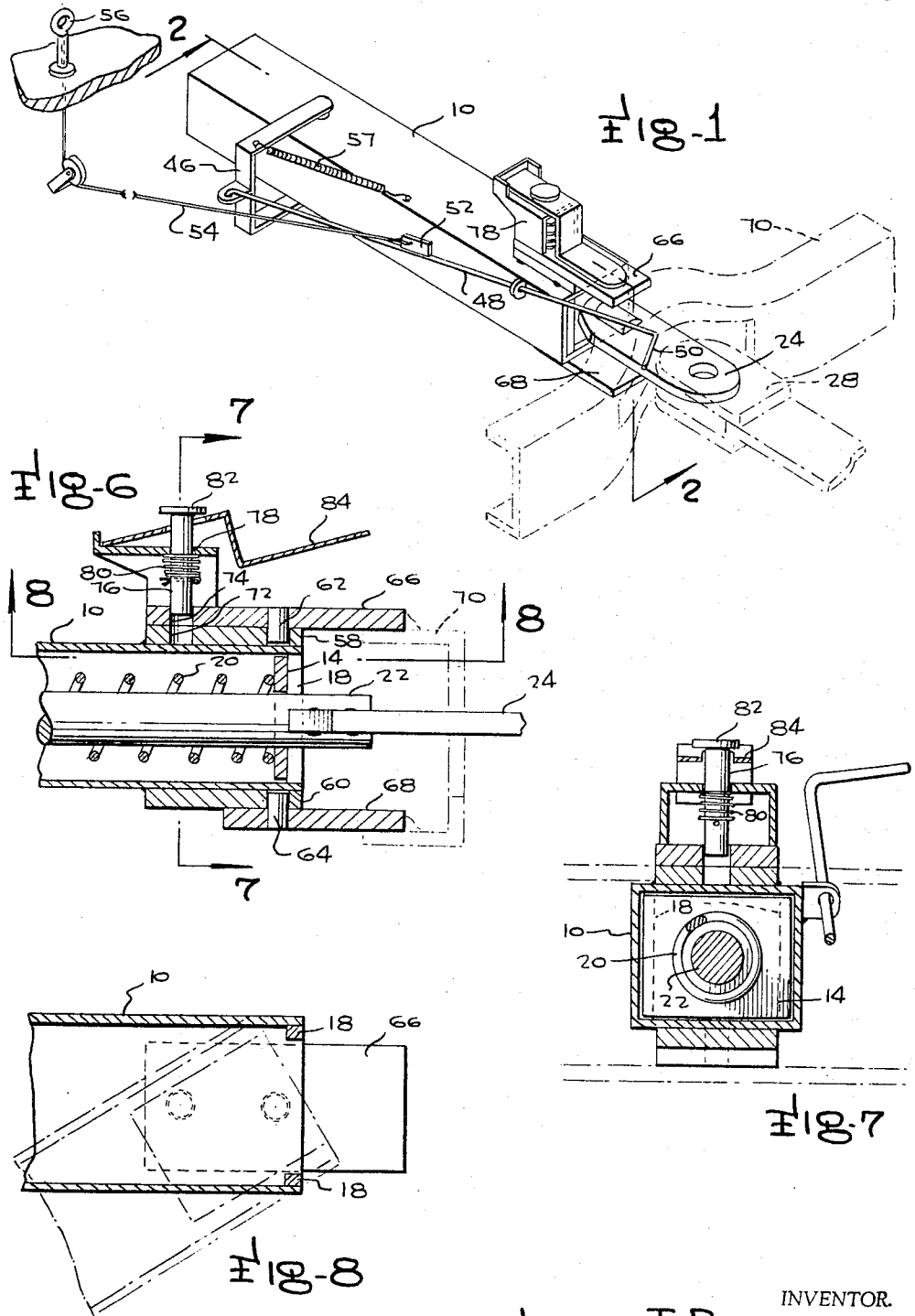
INVENTOR.
LOUIE J. BOUTWELL
BY
McMorrow, Berman & Davidson
ATTORNEYS

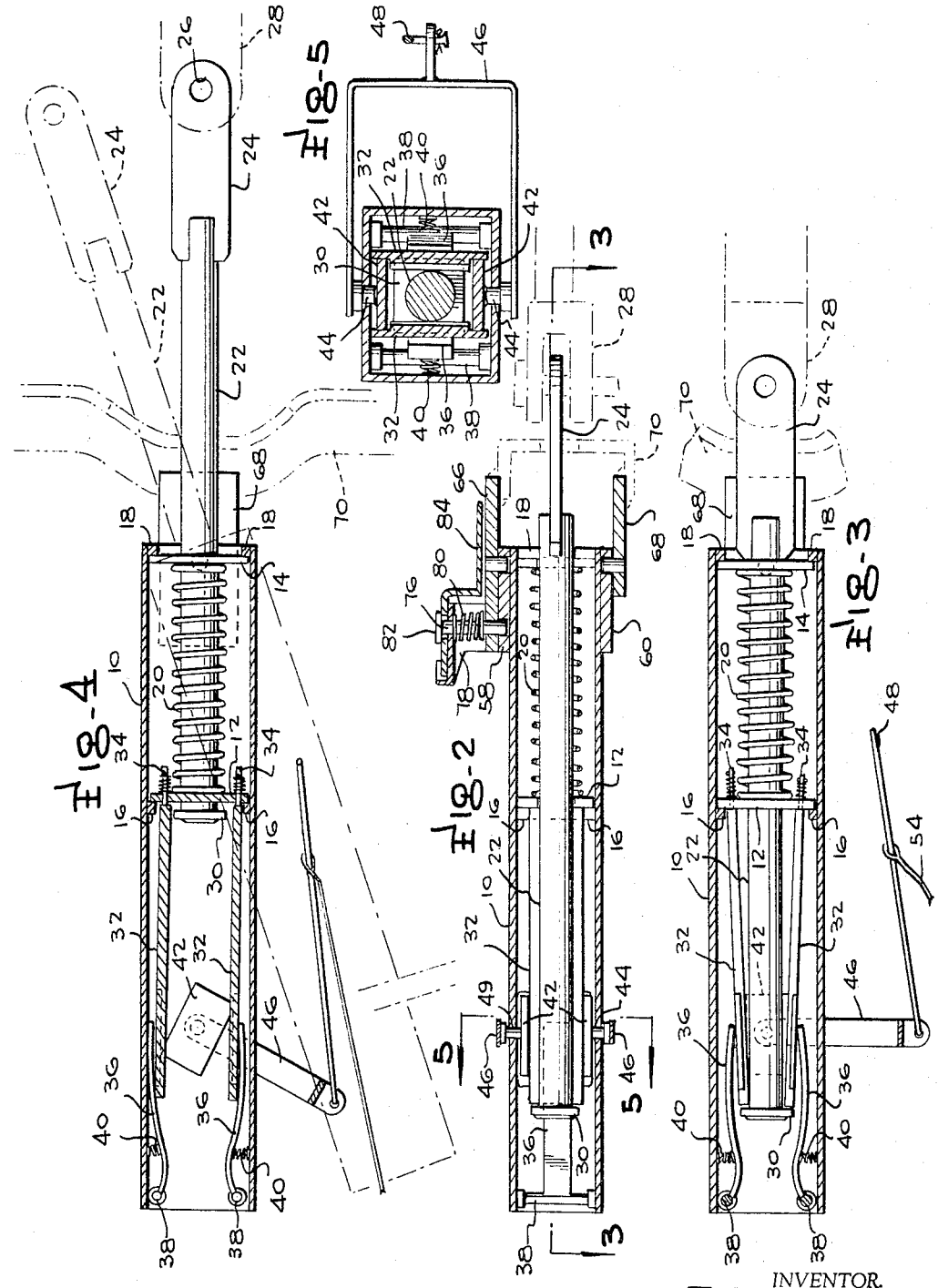

United States Patent Office 3,279,825
Patented Oct. 18, 1966

3,279,825
EXTENSIBLE AND SWINGABLE TOW HITCH
Louie J. Boutwell, P.O. Box 282, Lake Providence, La.
Filed Mar. 27, 1964, Ser. No. 355,363
2 Claims. (Cl. 280—478)

This invention relates to tow hitches for trailers, and like the device of my prior Patent No. 3,093,395, it is concerned with a hitch which is both extensible, and swingable in azimuth, for ready manipulation to connect with the vehicle to be towed, after a rough spotting of the hitch by the towing vehicle.

It is therefore a general object to provide an improved form of hitch of the type aforesaid. Another and more specific object is to provide a hitch which is more certain in its automatic action of return to towing position. Yet another object is to provide for a resilient towing connection, and a still further object is to provide for selective adjustment of the hitch during use for improvement of traction when necessary.

These and other objects, which will be apparent, are attained by the present invention, a preferred form of which is described in the following specification, as illustrated in the drawing, in which:

FIGURE 1 is a perspective view of the hitch, with associated parts shown in dash lines, FIGURE 2 is a vertical, longitudinal, sectional view through the hitch, taken on the plane of the line 2—2 of FIGURE 1, FIGURE 3 is a sectional view taken at right angles to that of FIGURE 2, as seen along the plane of the line 3—3 of FIGURE 2, FIGURE 4 is a view similar to FIGURE 3, showing the hitch extended, FIGURE 5 is a transverse, sectional view through the hitch, taken on the plane of the line 5—5 of FIGURE 2, FIGURE 6 is an enlarged, fragmentary view of the rear end of the hitch as shown in FIGURE 2, with the locking pin shown adjusted to unlocking position, FIGURE 7 is a transverse, sectional view through the hitch, taken on the plane of the line 7—7 of FIGURE 6, and FIGURE 8 is a sectional view taken on the plane of the line 8—8 of FIGURE 6.

Referring to the drawings by characters of reference there is shown an elongate, rectangular, tubular housing 10, having at one end a pair of movable, square washers 12, 14, retained by stops 16, 18, and resiliently held against the stops by a coil, compression spring 20. A round, drawbar rod 22, passing through washers 12, 14, and spring 20, has a flat tongue 24, at its outer end, bored as at 26, to receive a pintle, for swinging connection with the fork 28 of a trailer, and the rod is maintained in the housing, inwardly of the spring, by means of a head or collar 30, which is also rectangular. When the rod 22 is fully extended, the collar 30 is brought to bear on the spring 20, through washer 12. While the towing operation may be performed with the rod extended, such is not the principal intended use, the extension being mainly a device for facilitating the making of the pintle connection.

For normal towing, and also for stowage, the rod 22 is in a retracted position within tubular housing 10, and it is securely held in this position by a detent, in the form of a pair of crutch-like, rectangular bars 32, swing-mounted by means of bolts 34, mounted loosely in openings in washer 12, so as to be movable behind collar 30, to hold the rod retracted, or away from the collar, to release the rod for extension. The bars 32 are normally biased toward holding position by means of a pair of fingers 36, swingably mounted by trunnion shafts 38, and biased inwardly by small compression springs 40. The detent bars 32 are spread apart, against the bias of springs 40, by means of a pair of cams 42, carried by stub shafts 44, journalled in opposite walls of tube 10, and forming the trunnion mounts for an operating, fork member 46, carrying an operating, push-pull rod 48, with a handle 50. Rod 48 has a clip 52, anchoring a cable 54, which has a terminal loop 56 in the cab of the towing vehicle, so that the detents may be withdrawn at any time. Cams 42 are normally held in inoperative position by a tension spring 57.

As in the case of my aforesaid prior patent, the hitch is swingable in azimuth, as well as extensible, and the structure providing for swing is best seen in FIGURES 1, 2 and 6. Thus, the tube 10, at its rear end, has welded on its upper and lower faces a pair of plates 58 and 60, with axially aligned bores to receive a pair of trunnion pins 62, 64, carried, respectively, by an upper plate 66, and a lower plate 68, which are secured, as by welding, to the bumper 70, or other solid part of the towing vehicle. Thus, it will be seen that the hitch is swingable on the axis of trunnions 62, 64, together with the rod 22, and an adjusted position of swing of these parts is shown in dash lines in FIGURES 4 and 8. For locking the hitch in a central, or neutral position of swing, the top plates 58 and 66 are provided with registrable bores 72, 74, engageable by detent pin 76, slide-mounted in a bridge 78, and biased downwardly by a surrounding, compression spring 80. Pin 76 has a head 82, and is lifted out of locking position by a step-form lever 84, having an aperture received on pin 76, but smaller than head 82, and engaging bridge 78 with one end, as a fulcrum.

For a hitching operation the driver manipulates his vehicle to spot the drawbar tongue 24 in approximately hitching position, after which he dismounts and pushes on rod 48 to release the detents of the drawbar. Thereafter the rod 22 is freely slidable, and operation of lever 84 will also render it swingable, so that the tongue is quickly and easily brought to hitching position. Thereafter, forward movement of the towing vehicle will cause the hitch to swing to neutral position, so that pin 76 slips into bore 72, again locking the hitch against swing. During this initial movement, the towing is effected with bar 22 in extended position, but when the towing vehicle is backed up, the collar 30 of rod 22 again slips behind the ends of detent bars 32, and the hitch is thus converted to its shorter, working length. In either position of length of the hitch, the pull is communicated through the spring 20.

In another mode of use, the hitch may be lengthened by a pull on cable 54 from the driver's compartment, so that the towing vehicle may be moved forwardly with respect to the trailer, in cases where there is a failure of traction, i.e. slippage, in the normal position of the towing vehicle.

While a certain, preferred embodiment has been shown and described, various modifications will be apparent, in the light of this disclosure, and the invention should not, therefore, be deemed as limited, except insofar as shall appear from the spirit and scope of the appended claims.

I claim:

1. A tow hitch comprising a housing, a drawbar slidably-mounted in said housing, stop means defining an extended position of said drawbar, a removable detent defining a retracted position of said drawbar, spring means normally holding said detent in drawbar retaining position, means to remove said detent against the pressure of said spring means, said detent comprising a pair of swingably-mounted bars, and said drawbar having a headed portion engageable by said bars in their swinging movement, a compression spring surrounding said drawbar, within said housing, means swingably mounting said bars and engaging said spring, and said headed portion of said drawbar engageable with said means.

2. A device as in claim 1, said means comprising a washer mounted on said drawbar, and having apertures, headed pins carried by said bars and received in said apertures, and spring means on said pins.

References Cited by the Examiner

UNITED STATES PATENTS

| 1,422,189 | 7/1922 | Eckertz | 280—478 |
| 2,340,786 | 2/1944 | Winn | 280—478 |
| 2,444,979 | 7/1948 | Conrad et al. | 280—478 |
| 2,446,223 | 8/1948 | Forney | 280—478 |
| 3,140,881 | 7/1964 | Antici | 280—478 |

LEO FRIAGLIA, *Primary Examiner.*